(12) United States Patent
Shin et al.

(10) Patent No.: US 8,039,802 B2
(45) Date of Patent: Oct. 18, 2011

(54) APPARATUS FOR GENERATING/DETECTING THZ WAVE AND METHOD OF MANUFACTURING THE SAME

(75) Inventors: Jaeheon Shin, Daejeon (KR); Kyung Hyun Park, Daejeon (KR); Namje Kim, Daejeon (KR); Sang-Pil Han, Daejeon (KR); Chul-Wook Lee, Daejeon (KR); Eundeok Sim, Daejeon (KR); Yongsoon Baek, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/764,361

(22) Filed: Apr. 21, 2010

(65) Prior Publication Data
US 2011/0068270 A1    Mar. 24, 2011

(30) Foreign Application Priority Data

Sep. 18, 2009   (KR) ................. 10-2009-0088664

(51) Int. Cl.
    *G01J 5/02* (2006.01)
(52) U.S. Cl. .................................. 250/341.1
(58) Field of Classification Search .... 250/338.1–338.5, 250/341.1–341.8
    See application file for complete search history.

(56) References Cited

U.S. PATENT DOCUMENTS

| | | | | |
|---|---|---|---|---|
| 5,663,639 A | * | 9/1997 | Brown et al. | 324/96 |
| 5,914,497 A | * | 6/1999 | Sherwin | 257/21 |
| 7,633,043 B2 | * | 12/2009 | Ouchi | 250/214.1 |
| 2006/0085160 A1 | * | 4/2006 | Ouchi | 702/150 |
| 2006/0151722 A1 | * | 7/2006 | Cole et al. | 250/493.1 |
| 2006/0152412 A1 | * | 7/2006 | Evans et al. | 343/700 MS |
| 2007/0218376 A1 | * | 9/2007 | Ouchi | 430/56 |
| 2008/0048678 A1 | * | 2/2008 | Kurosaka et al. | 324/639 |
| 2008/0315098 A1 | * | 12/2008 | Itsuji | 250/330 |
| 2009/0236529 A1 | * | 9/2009 | Kasai et al. | 250/343 |
| 2010/0033709 A1 | * | 2/2010 | Lampin et al. | 356/51 |
| 2010/0052083 A1 | * | 3/2010 | Kasai | 257/431 |

FOREIGN PATENT DOCUMENTS

| | | | |
|---|---|---|---|
| JP | 2007281419 A | * | 10/2007 |
| KR | 10-0310859 | | 9/2001 |
| KR | 10-0899554 | | 5/2009 |

OTHER PUBLICATIONS

Tani et al., "Emission characteristics of photoconductive antennas based on low-temperature-grown GaAs and semi-insulating GaAs," 1997, Applied Physics, vol. 36, No. 30, pp. 7853-7859.*

Lloyd-Hughes et al., "Simulation and optimisation of terahertz emission from InGaAs and InP phtoconductive switches," 2005, Solid State Communications, vol. 136, pp. 595-600.*

Yano et al., "Terahertz wave detection performance of photoconductive antennas: Role of antenna structure and gate pulse intensity," 2005, Journal of Applied Physics, vol. 97, 103103-1 to 103103-6.*

* cited by examiner

Primary Examiner — Kiho Kim
(74) Attorney, Agent, or Firm — Rabin & Berdo, P.C.

(57) ABSTRACT

Provided are an apparatus for generating/detecting terahertz wave and a method of manufacturing the same. The apparatus includes a substrate, a photo conductive layer, a first electrode and a second electrode, and a lens. The photo conductive layer is formed on an entire surface of the substrate. The first electrode and a second electrode formed on the photo conductive layer. The first and second electrodes are spaced from each other by a certain gap. The lens is formed on the first and second electrodes. The lens is filled in the gap between the first and second electrodes.

18 Claims, 6 Drawing Sheets

APPARATUS FOR GENERATING/DETECTING THZ WAVE AND METHOD OF MANUFACTURING THE SAME

CROSS-REFERENCE TO RELATED APPLICATIONS

This U.S. non-provisional patent application claims priority under 35 U.S.C. §119 of Korean Patent Application No. 10-2009-0088664, filed on Sep. 18, 2009, the entire contents of which are hereby incorporated by reference.

BACKGROUND OF THE INVENTION

The present invention disclosed herein relates to an apparatus for generating/detecting a Terahertz (THz) wave and a method of manufacturing the same, and more particularly, to an apparatus for generating/detecting a THz wave adopting a cost-saving lens and a method of manufacturing the same.

A THz wave technology of 0.1 THz to 3 THz range in the electromagnetic band has a feature that transmits non-metallic and non-polar materials as well as a feature that resonant frequencies of very various molecules are distributed within the above range. The terahertz wave technology is a high-technology field that is expected to provide a new conceptual analysis technology that has never been in various application fields such as medicals, agricultures, foods, environment measurements, biotechnologies, safeties, and high-tech material evaluations using real-time identification of the molecules by non-destructive, non-opening, and non-contact methods. Since the terahertz wave technology has little effect on a human body due to very low energy level of several meV, the terahertz wave technology is rapidly rising as an essential core technology for realizing an anthropocentric ubiquitous society, and the demands on the terahertz wave technology are rapidly increasing.

Examples of currently-used terahertz generation methods include a frequency multiplying method, a backward wave oscillator, a photomixing, a CO2 pumped gas laser, a quantum cascade laser, and a free electron laser. Many studies are being conducted to develop a terahertz wave source operating in a frequency band of 0.1 THz to 10 THz, so-called terahertz gap, but have not yet been developed to an appropriate terahertz wave source technology meeting portable, non-cooling, and low-costing requirements necessary for commercialization.

An apparatus for generating/detecting terahertz wave most extensively used until recently employs a photomixing method based on Time Domain Spectroscopy (TDS) that generates a terahertz wave by irradiating a femtosecond ultra-short pulse laser on a semiconductor having a high-speed response time. The apparatus for generating/detecting terahertz wave including a femtosecond high power pulse laser and a photomixer has an advantage of providing a high signaltonoise ratio (SNR), but essentially requires the femtosecond high power pulse laser and a very delicate optical system. Accordingly, there are many limitations for development into a portable measuring instrument due to high price and great system size.

An apparatus for generating/detecting terahertz wave based on Frequency Domain Spectroscopy (FDS) that have been developed later than the TDS receives new attention as a more portable and commercialized technology by using two continuous wave diode lasers (LD) of cheap price and small size as an excitation light source instead of a femtosecond high-power laser of expensive price and great size. However, since using various expensive components and delicate packaging technologies, this FDS-based apparatus for generating/detecting terahertz wave is still known as an expensive apparatus used only in laboratories. Recently, various commercialization technologies such as attempts to use a dual-mode tunable LD as an excitation light source and integrate the excitation light source and a photomixer are being studied for portability and cost-saving.

SUMMARY OF THE INVENTION

The present invention provides an apparatus for generating/detecting a Terahertz (THz) wave and a method of manufacturing the same, which can increase or maximize productivity by adopting cost-saving components and reducing difficulties of packaging technologies.

Embodiments of the present invention provide apparatuses for generating/detecting terahertz wave, including: a substrate; a photo conductive layer on an entire surface of the substrate; a first electrode and a second electrode on the photo conductive layer, the first and second electrodes being spaced from each other by a certain gap; and a lens on the first and second electrodes, the lens being filled in the gap between the first and second electrodes.

In some embodiments, the lens may be formed of a plastic material. Here, as the lens is formed of a cheap plastic material, the component price may be lowered. The plastic may have a refractive index of about 1.3 to about 1.5 in a terahertz wave range of 0.1 THz to 10 THz.

In other embodiments, the lens may have a dome or bell shape protruding from the first and second electrodes. The terahertz wave generated at all or part of the gap between the first and second electrodes and the antenna including the gap may radiate from the inside of the lens, and may contact an air at an outer edge of the dome or bell shape to travel in a parallel or slightly radiation-angled direction.

In still other embodiment, the lens may be attached onto the first and second electrode by an adhesive. The adhesive may include epoxy, silicon, hot melt, polymer, and PVAc.

In even other embodiments, the lens may have a diameter greater than a total length of the first and second electrodes. The lens may be formed to cover the photo conductive layer exposed between the first and second electrode.

In yet other embodiments, if the substrate is formed of GaAs, the photo conductive layer may be formed of a low-temperature GaAs. The photo conductive layer may be grown with the same or similar lattice direction on the substrate.

In further embodiments, if the substrate is formed of InP, the photo conductive layer may be formed of a low-temperature InGaAs or an ion implantation InGaAs. The photo conductive layer may be grown with the same or similar lattice direction on the substrate.

In still further embodiments, the substrate may include a first opening overlapping with the gap between the first and second electrodes. A pulse or beat light source may be incident to the photo conductive layer through the first opening.

In even further embodiments, the first opening may have a smaller size than a diameter of the lens. The photo conductive layer exposed by the first opening may be supported by the bottom of the lens and may be prevented from being torn. The lens may be supported by a portion of the substrate at the outer edge of the first opening.

In yet further embodiments, the apparatus may further include an etch block layer on the photo conductive layer. The etch block layer may serve as a protecting layer for protecting the photo conductive layer from an etchant or etching gas in the etching of the first opening.

In much further embodiment, the etch block layer may include a second opening that exposes the photo conductive layer in the gap between the first and second electrodes. The second opening may electrically connect the first and second electrodes to the photo conductive layer filled with the lens.

In still much further embodiment, the second opening may have a smaller size than a diameter of the lens. The etch block layer may be formed extending to a lower part of the lens, covering the entire surface of the photo conductive layer exposed by the lens.

In even much further embodiment, the apparatus may further include an etch stopper layer on the entire undersurface of the photo conductive layer over the substrate. The etch stopper layer may protect the photo conductive layer in the forming of the first opening.

In other embodiments of the present invention, methods of manufacturing an apparatus for generating/detecting terahertz wave include: forming a photo conductive layer on a substrate; forming a first electrode and a second electrode on the photo conductive layer, the first and second electrodes being spaced from each other by a certain gap; forming a lens filled in the gap between the first and second electrodes and protruding from the first and second electrodes; and forming a first opening exposing the photo conductive layer by etching the substrate, the first opening overlapping with the gap.

In some embodiments, the lens may be attached onto the first and second electrodes and an inside of the gap between the first and second electrodes by an adhesive. The adhesive may attach the lens to the photo conductive layer exposed at the gap between the first and second electrodes.

In other embodiments, the method may further include forming an etch stopper layer between the substrate and the photo conductive layer. The etch stopper layer may be formed between the substrate and the photo conductive layer to protect the photo conductive layer from an etchant or etching gas that etches the substrate in the forming of the first opening by the etching the substrate.

In still other embodiments, if the substrate is formed of GaAs, the forming of the first opening may include removing the substrate using a citric acid etchant to expose the etch stopper layer.

In even other embodiments, the method may further include forming an etch block layer or an insulating layer between the first and second electrodes and the photo conductive layer.

In yet other embodiments, the etch block layer or the insulating layer may include a second opening that exposes the photo conductive layer under the lens.

In further embodiments, if the substrate is formed of InP and the photo conductive layer is formed of a low-temperature InGaAs, the forming of the first opening may include removing the substrate using a etchant having a etch selectivity with respect to the substrate compared to the photo conductive layer.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
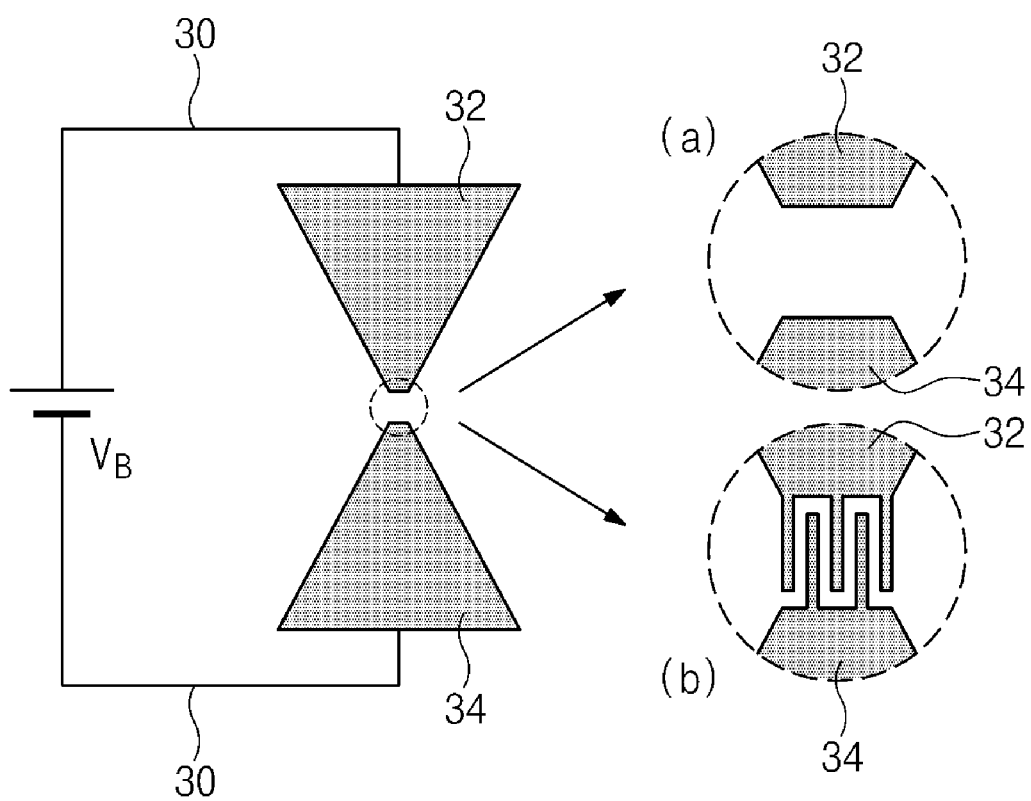
FIG. 1 is a diagram illustrating principles of an apparatus for generating/detecting a Terahertz wave.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the drawings, the dimensions of layers and regions are exaggerated for clarity of illustration. It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals refer to like elements throughout.

Hereinafter, it will be described about an apparatus for generating/detecting a Terahertz wave and a method of manufacturing the same according to an exemplary embodiment of the present invention in conjunction with the accompanying drawings.

FIG. 1 is a diagram illustrating principles of an apparatus for generating/detecting a Terahertz wave. If a direct current voltage is applied between first and second antenna electrodes 32 and 34 having a gap of a simple square (a) or a cross finger (b) shape and spaced from each other and simultaneously a pulse or beat light source (50 of FIG. 2) is irradiated to the gap, the apparatus for generating/detecting a Terahertz wave can generate/detect a terahertz wave (60 of FIG. 2) at all or part of the gap and the first and second antenna electrodes 32 and 34 including the gap. The first and second antenna electrodes 32 and 34 are connected to a power source VB through an electric line 30.

Figure 2:
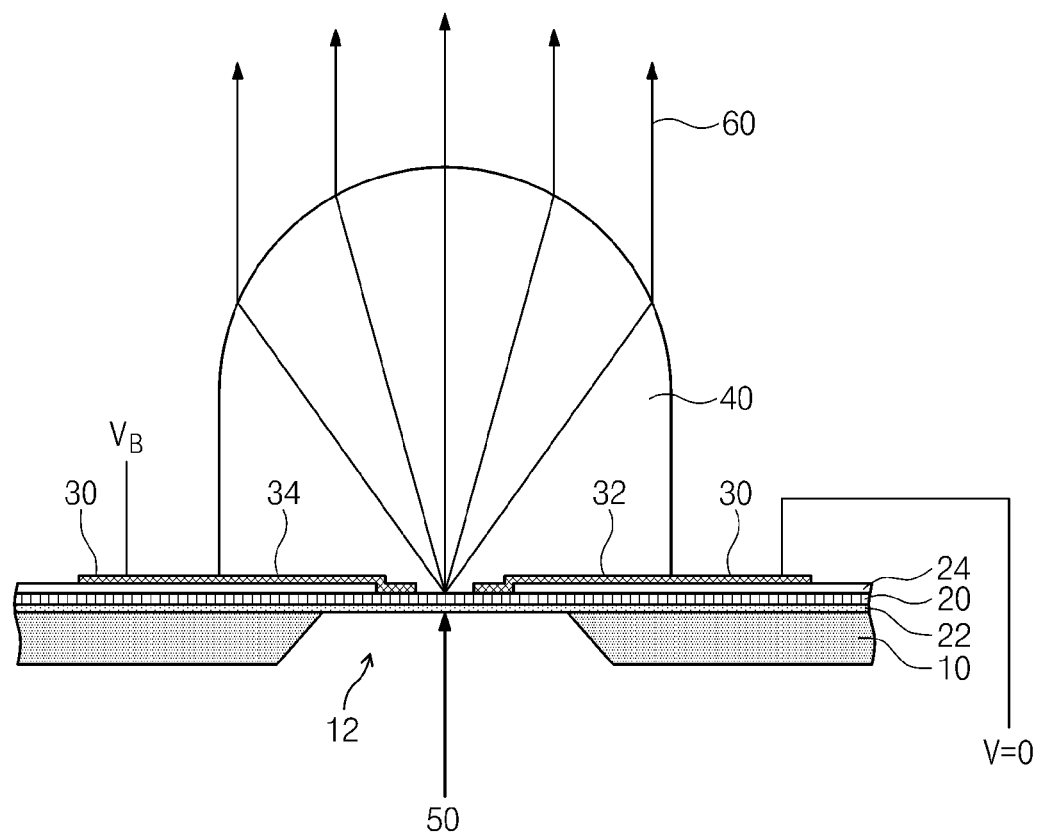
FIG. 2 is a cross-sectional view illustrating an apparatus for generating/detecting a Terahertz wave according to a first embodiment.

FIG. 2 is a cross-sectional view illustrating an apparatus for generating/detecting a Terahertz wave according to a first embodiment.

Referring to FIG. 2, an apparatus for generating/detecting a Terahertz wave according to a first embodiment includes an etch stopper layer 22 and a photo conductive layer 20 that are formed on a substrate 10 with a first opening 12, and first and second antenna electrodes 32 and 34 formed on the photo conductive layer 20 over the first opening 12 and spaced from each other by a certain gap. The apparatus for generating/detecting a Terahertz wave further includes a lens 40 filled in the gap between the first and second antenna electrodes 32 and 34 and protruding from the first and second antenna electrodes 32 and 34. The lens 40 contacts an exposed surface of the photo conductive layer 20 between the first and second antenna electrodes 32 and 34 and the surfaces of the first and second antenna electrodes 32 and 34. For example, the lens 40 may be strongly attached to these surfaces by petrochemical adhesives such as epoxy, silicon, hot melt, polymer, and PVAc. The bottom of the lens 40 is inserted into the gap between the first and second antenna electrodes 32 and 34, and the top of the lens 40 is formed in a dome or bell-shape. In this case, the lens 40 may have a diameter of about 500 μm or more and a height about 0.5 to about 1.5 times the diameter. The upper part of the lens 40 is formed in a spheric or aspheric shape.

The lens 40 is a component formed of an injection-molded plastic material. The lens 40 has a refractive index of about 1.3 to about 1.5 in a terahertz wave range (from about 0.1 THz to about 10 THz), and includes transparent or opaque thermoplastic and thermosetting resins. Examples of the thermoplastic resin include polyvinyl chloride (PVC), polyethylene (PE), polystyrene (PS), shock-resistant polystyrene (SB), polypropylene (PP), acrylonitrile butadiene styrene (ABS), acrylonitrile styrene resin (ASTMWL:S-AN), polymethyl metacrylate, polymethylmethacrylate (methacryl resin PMMA), polyamide (nylon:PA), polyacetal (POM), polycarbonate (PC), polyethylene terephthalate (PET, PETP), polybutylene terephthalate (PBT), modified polyphenylene ether (m-PPE), fluoroplastic (Teflon or polytetrafluoroethylene (PTFE)), and filling thermoplastic. Examples of the thermosetting resin include phenol-formaldehyde (PF), urea-formaldehyde (UF), melamine-formaldehyde, unsaturated polyester (UP), epoxy (EP), and polyurethane (PUR). Accordingly, the apparatus for generating/detecting a Terahertz wave may have high economical efficiency because the lens 40 formed of a cheap injection-molded plastic material is attached onto the first and second antenna electrodes 32 and 34 over the photo conductive layer 20.

The first and second antenna electrodes 32 and 34 are formed under the lens 40, and the electric lines 30 are extended to the outer side of the lens. For example, the first and second antenna electrodes 32 and 34 are formed to have the total size of about 500 μm. The lens 40 is formed to have a diameter greater than the first and second antenna electrodes 32 and 34. Accordingly, the first and second antenna electrodes 32 and 34 may be covered by the lens 40. The electric line 30 may be formed at the same level as the first and second antenna electrodes 32 and 34, and may be formed at the outer side of the bottom of the lens 40.

The photo conductive layer 20 includes a material having conductivity with respect to a pulse or continuous light source incident from the outside. For example, the photo conductive layer 20 may include a low temperature-GaAs, and may be formed in a thickness of about 0.3 μm to about 3 μm.

An etch block layer 24 and an etch stopper layer 22 are formed on and under the photo conductive layer 20, respectively. The etch block layer 24 and the etch stopper layer 22 serve as protecting layers for protecting the photo conductive layer 20 from etchants or etching gases in an etching process of forming the first opening 12.

The etch block layer 24 is formed on the entire surface of the photo conductive except a second opening (26 of FIG. 3A) under the lens 40. Also, the etch block layer is formed under the electric line 30 and the first and second antenna electrodes 32 and 34. In this case, the etch block layer 24 may be extended to the circumference of the gap between the first and second antenna electrodes 32 and 34 under the lens 40. The etch block layer 24 may be formed to have the second opening 26 greater than the gap between the first and second antenna electrodes 32 and 34. This is because the first and second antenna electrodes 32 and 34 must be electrically connected to the photo conductive layer 20 while maintaining a gap of a certain size to expose the photo conductive layer 20. Accordingly, the second opening 26 is formed greater than the gap between the first and second antenna electrodes 32 and 34 and smaller than the diameter of the lens 40. Also, the etch block layer 24 may be formed over the first and second antenna electrodes 32 and 34. The etch block layer 24 may be formed to the lower part of the lens while covering the first and second antenna electrodes 32 and 34 on the photo conductive layer 20. For example, the etch block layer 24 may include an inorganic or organic dielectric having an excellent corrosion-resistance to an acid etchant (for example, citric acid) or etching gas.

Similarly, the etch stopper layer 22 includes an undoped-AlAs having an excellent corrosion-resistance to an etchant or etching gas for etching the substrate 100 formed of GaAs. The etch stopper layer 22 may be formed on the entire undersurface of the photo conductive layer 20, and may be downwardly exposed to the substrate 10.

The substrate 10 is a base layer for an epitaxial growth of the photo conductive layer 20, and is formed of GaAs. For example, the substrate 10 has a thickness of about 300 μm to about 500 μm. The first opening 12 formed in the substrate 10 may penetrate the substrate 10, and expose the etch stopper layer 22. The first opening 12 overlaps with the gap between the first and second antenna electrodes 32 and 34. In consideration of distortion of terahertz wave 60 and modification of the photo conductive layer 20, the diameter of the first opening 12 may be greater than a half of the total size of the first and second antenna electrodes 32 and 34, and smaller than about 0.9 times the diameter of the lens 40. Accordingly, the lens 40 having a diameter greater than about 1.1 times the first opening 12 may be supported by the first and second antenna electrodes 32 and 34 over the substrate 10. Also, the lens 40 may support the photo conductive layer 20 over the opening 12 to prevent the photo conductive layer 20 from being modified or torn.

Accordingly, the apparatus for generating/detecting a Terahertz wave according to the first embodiment adopts a lens 40 of a cheap plastic material attached using an adhesive, thereby lowering the component price and packaging cost significantly compared to a typical silicon lens.

In this case, if a pulse or beat light source 50 is supplied from a lower side of the substrate to the etch stopper layer 22 exposed to the first opening 12, an alternating current is generated from the photo conductive layer 20 by a photoelectric and photomixing effect, generating a terahertz wave 60 at all or part of the gap between the first and second antenna electrodes 32 and 34 and the antenna including the gap. The terahertz wave radiates in a traveling direction of a pulse or beat light source 50 in the plastic lens 40, and is refracted at the spheric surface of the lens 40 to travel in a parallel or slightly radiation-angled direction.

Hereinafter, a method of manufacturing an apparatus for generating/detecting terahertz wave according to a first embodiment will be described in detail with reference to the accompanying drawings.

FIGS. 3A through 3D is cross-sectional views sequentially illustrating a method of manufacturing the apparatus for generating/detecting terahertz wave according to the first embodiment of FIG. 2.

Figure 3A:
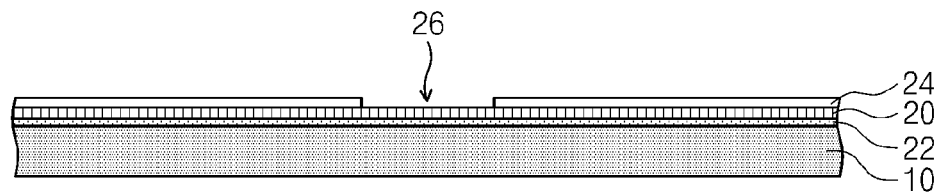
FIGS. 3A through 3D is cross-sectional views sequentially illustrating a method of manufacturing the apparatus for generating/detecting terahertz wave according to the first embodiment of FIG. 2.

Referring to FIG. 3A, an etch stopper layer 22, a photo conductive layer 20, and an etch block layer 24 are formed on a substrate 10. Here, a growth direction may be determined to increase electrical or optical characteristics according to the formation method of the photo conductive layer 20. The photo conductive layer 20 mainly formed through an epitaxial method may be formed with the lattice of which is identical or similar to the substrate. For example, if a low-temperature GaAs is selected as the photo conductive layer 200, the substrate 10 may be formed of GaAS undoped with conductive impurities. In this case, the etch stopper layer 22 between the substrate 10 and the photo conductive layer 20 may include at least one of the same materials as constituent materials of the substrate 10 and the photo conductive layer 20 to protect the photo conductive layer 20 from a subsequent etching of the substrate 10. This is because mismatch of the lattice directions between the photo conductive layer 20 and the substrate 10 can be minimized The etch block layer 24 on the photo conductive layer 20 may include a second opening 26 exposing a certain portion of the photo conductive layer 20 through a photolithography process.

Figure 3B:
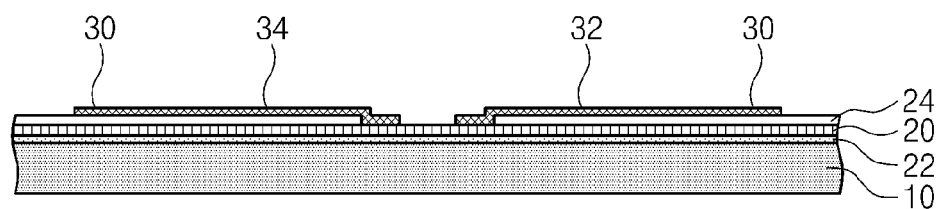

Referring to FIG. 3B, first and second antenna electrodes 32 and 34 and electric lines 30 are formed on the etch block layer 24. The first and second antenna electrodes 32 and 34 may be patterned to have a certain size of a gap in the photo conductive layer 20 exposed by the second opening 26, and extend to the outer side of the second opening 26. Also, the electric lines 30 may be patterned to be connected to the first and second electrodes 32 and 34 over the etch block layer 24, respectively.

Figure 3C:
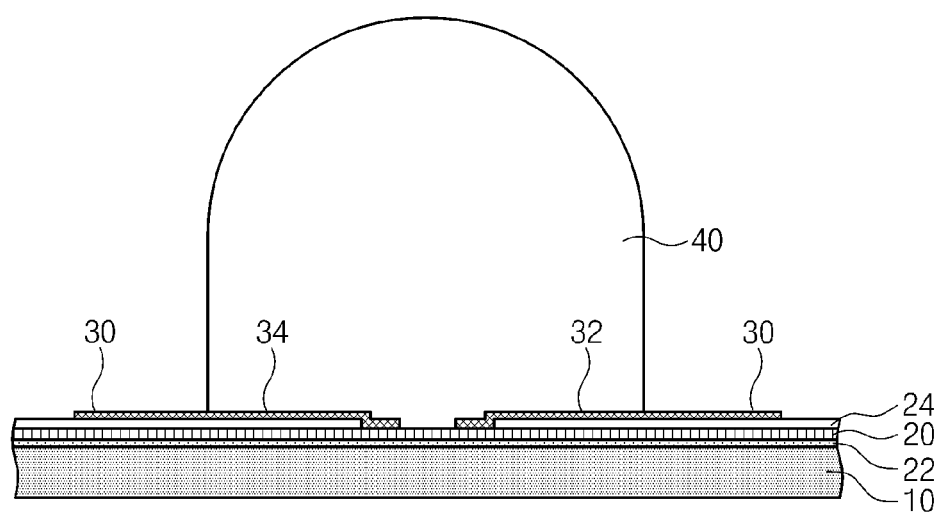

Referring to FIG. 3C, a lens 40 injection-molded using plastic is disposed on the first and second antenna electrodes 32 and 34. The lens 40 may be attached by petrochemical adhesives such as epoxy, silicon, hot melt, polymer, and PVAc that have the same or similar refractive index to that of the lens 40 formed of plastic materials. In this case, the lens 40 may be compressively fixed at the substrate 10 by an external pressure to inhibit generation of air bladders on the surface of the photo conductive layer 20 exposed between the first and second antenna electrodes 32 and 34.

Figure 3D:
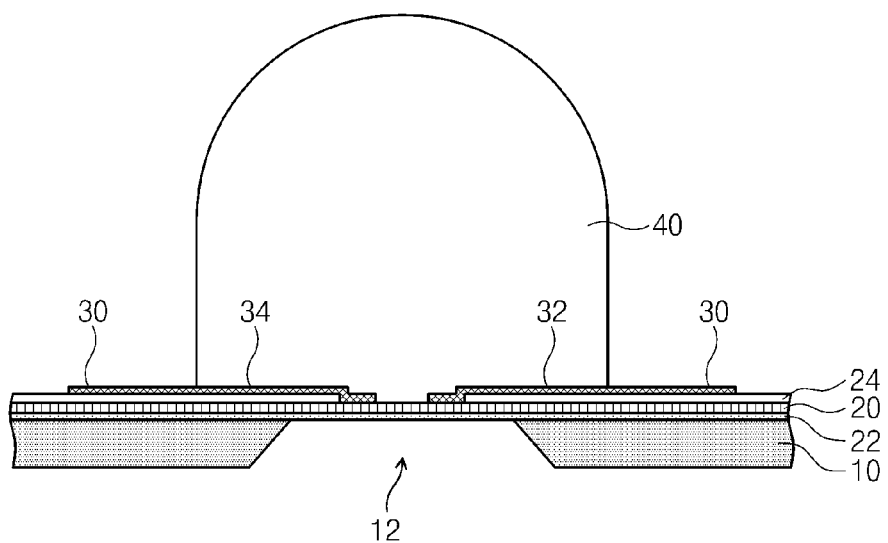

Referring to FIG. 3D, a portion of the undersurface of the substrate 10 where the lens 40 is formed is etched to form a first opening 12 that exposes the etch stopper layer 22. The first opening 12 may be formed using a photoresist layer (not shown) exposing the undersurface of the substrate as an etch mask. If the substrate 10 is a GaAs substrate, the substrate 10 may be wet-etched using a citric acid etchant to form the first opening 12.

Accordingly, the method of manufacturing an apparatus for generating/detecting terahertz wave according to the first embodiment can improve productivity because the method does not require delicate packaging technology by attaching the lens 40 of a plastic material using an adhesive and wet-etching the substrate 10 under the lens 40.

Figure 4:
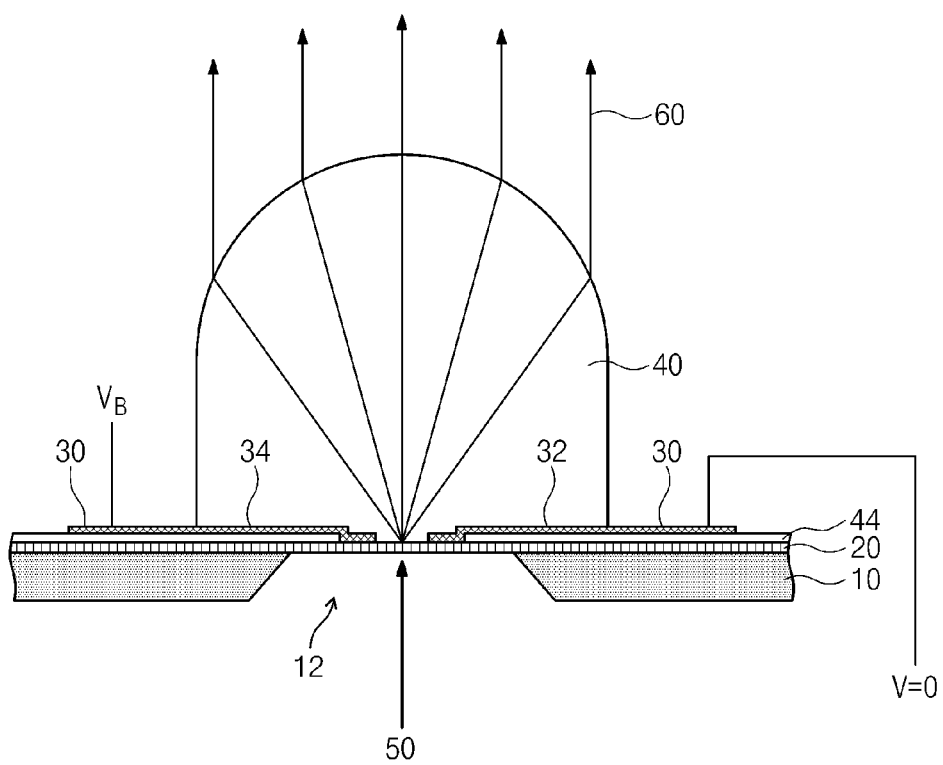
FIG. 4 is a cross-sectional view illustrating an apparatus for generating/detecting a Terahertz wave according to a second embodiment.

FIG. 4 is a cross-sectional view illustrating an apparatus for generating/detecting a Terahertz wave according to a second embodiment.

Referring to FIG. 4, an apparatus for generating/detecting a Terahertz wave according to a second embodiment includes a photo conductive layer 20 and an insulating layer 44 that are stacked on a substrate 10 with a first opening 12, and first and second antenna electrodes 32 and 34 contacting the photo conductive layer 20 over the first opening 12 and spaced from each other by a certain gap. The apparatus for generating/detecting a Terahertz wave further includes a lens 40 formed on the photo conductive layer 20 exposed between the first and second antenna electrodes 32 and 34.

The lens 40 may be formed of plastic materials, and may be attached to the photo conductive layer 20 and the first and second antenna electrodes 32 and 34. The lens 40 may be attached to the substrate 10 as a component having various shapes such as spherical, oval, and cylindrical shapes. The upper part of the lens 40 may be in a spheric or aspheric shape. Accordingly, the apparatus for generating/detecting a Terahertz wave may have high economical efficiency because the lens 40 is attached by adhesives.

The first and second antenna electrodes 32 and 34 are formed under the lens 40, and the electric lines 30 are extended to the outer side of the lens. Accordingly, the lens 40 is formed to have a diameter greater than the first and second antenna electrodes 32 and 34.

The photo conductive layer 20 includes a material generating a current with a pulse or beat light source incident from the outside. For example, the photo conductive layer 20 may include a low temperature-InGaAs or an ion-implantation InGaAs, and may be formed in a thickness of about 0.3 μm to about 3 μm.

The insulating layer 44 electrically isolates the photo conductive layer 20 from the electric line 30, and portions of the first and second antenna electrodes 32 and 34 from the photo conductive layer 20. Accordingly, the insulating layer 44 is formed to have a second opening (46 of FIG. 5A) where the first and second antenna electrodes 32 and 34 contact the photo conductive layer 20 under the insulating layer 44. Since the low-temperature-InGaAs constituting the photo conductive layer 20 has a lower resistance than a low-temperature GaAs, an increase of an area contacting the first and second antenna electrodes 32 and 34 may cause an increase of a dark current. Accordingly, the insulating layer 44 may be formed to expose the photo conductive layer 20 through the second opening 46 overlapping with the first opening 12. That is, the second opening 46 may serve to control the area where the photo conductive layer 20 contacts the first and second antenna electrodes 32 and 34.

The substrate 10 is a base layer for an epitaxial growth of the photo conductive layer 20, and is formed of a material having an etch selectivity with respect to the photo conductive layer 20 for an etchant or an etching gas. For example, the substrate 10 may include InP that can easily be removed by a selective etchant (hydrochloric acid+phosphoric acid) having an etching selectivity with respect to InGaAs, and may have a thickness of about 300 μm to about 500 μm. The first opening 12 formed in the substrate 10 may penetrate the substrate 10, and expose the photo conductive layer 20. As described above, the diameter of the first opening 12 may be greater than a half of the total size of the first and second antenna electrodes 32 and 34, and smaller than about 0.9 times the diameter of the lens 40.

If a pulse or beat light source 50 is supplied from a lower side of the substrate to the photo conductive layer 20 exposed to the first opening 12, an alternating current is generated from the photo conductive layer 20 by a photoelectric and photomixing effect, generating a terahertz wave 60 at all or part of the gap between the first and second antenna electrodes 32 and 34 and the antenna including the gap. The terahertz wave radiates in a traveling direction of a pulse or beat light source 50 in the plastic lens 40, and is refracted at the spheric surface of the lens 40 to travel in a parallel or slightly radiation-angled direction.

Hereinafter, a method of manufacturing an apparatus for generating/detecting a Terahertz wave according to a second embodiment will be described in detail with reference to the accompanying drawings.

FIGS. 5A through 5D are cross-sectional views sequentially illustrating a method of manufacturing the apparatus for generating/detecting a Terahertz wave according to the second embodiment of FIG. 4.

Figure 5A:
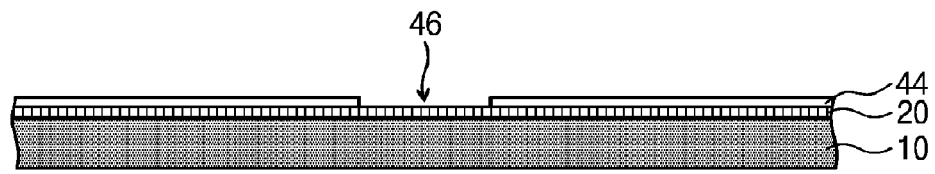
FIGS. 5A through 5D are cross-sectional views sequentially illustrating a method of manufacturing the apparatus for generating/detecting a Terahertz wave according to the second embodiment of FIG. 4.

Referring to FIG. 5A, a photo conductive layer 20 and an insulating layer 44 are formed on a substrate 10.

The photo conductive layer 20 may be formed on the entire surface of the substrate 10 through an epitaxial method. The photo conductive layer 20 may be formed of a material having a similar lattice direction to the substrate 10. For example, the substrate 10 may be formed of InP, and the photo conductive layer 20 may include a low-temperature InGaAs or an ion implantation InGaAs. The insulating layer 44 may be formed a high-resistance inorganic or organic dielectric, and may be patterned to have a second opening 46 exposing the photo conductive layer 20.

Figure 5B:
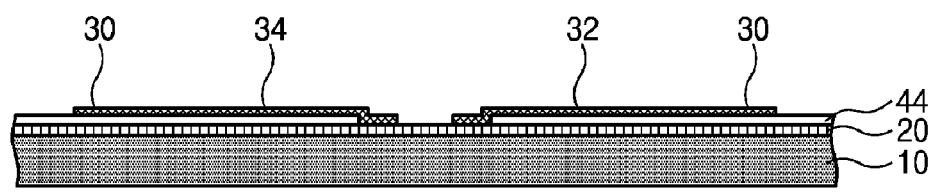

Referring to FIG. 5B, first and second antenna electrodes 32 and 34 and electric lines 30 are formed on the second opening 46 and the insulating layer 44. The first and second antenna electrodes 32 and 34 may be patterned to have a certain size of a gap in the photo conductive layer 20 exposed by the second opening 46, and extend to the outer side of the second opening 46. The second opening 46 may be formed to control an area where the first and second antenna electrodes 32 and 34 contact the photo conductive layer 20. The electric lines 30 may be patterned to be connected to the first and second electrodes 32 and 34 over the insulating layer 44, respectively.

Figure 5C:
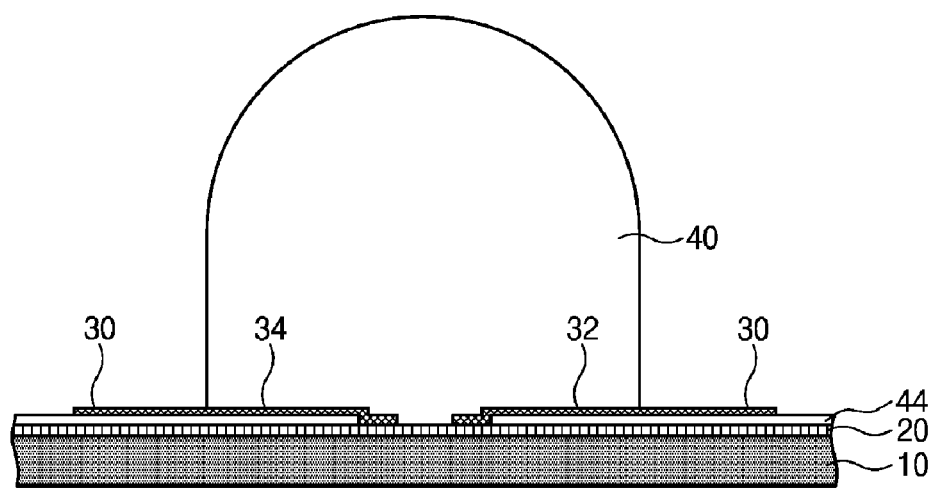

Referring to FIG. 5C, a lens 40 injection-molded using plastic is disposed on the first and second antenna electrodes 32 and 34. The lens 40 may be attached by petrochemical adhesives such as epoxy, silicon, hot melt, polymer, and PVAc that have the same or similar refractive index to that of the lens 40 formed of plastic materials. In this case, the lens 40 may be attached to the photo conductive layer 20 exposed by the insulating layer 44 and the second opening 46 and the electric lines 30 by adhesives. Accordingly, the method of manufacturing an apparatus for generating/detecting terahertz wave according to the second embodiment can improve economical efficiency because the lens 40 of a cheap plastic material can easily be attached to the first and second antenna electrodes 32 and 34 using adhesives.

Figure 5D:
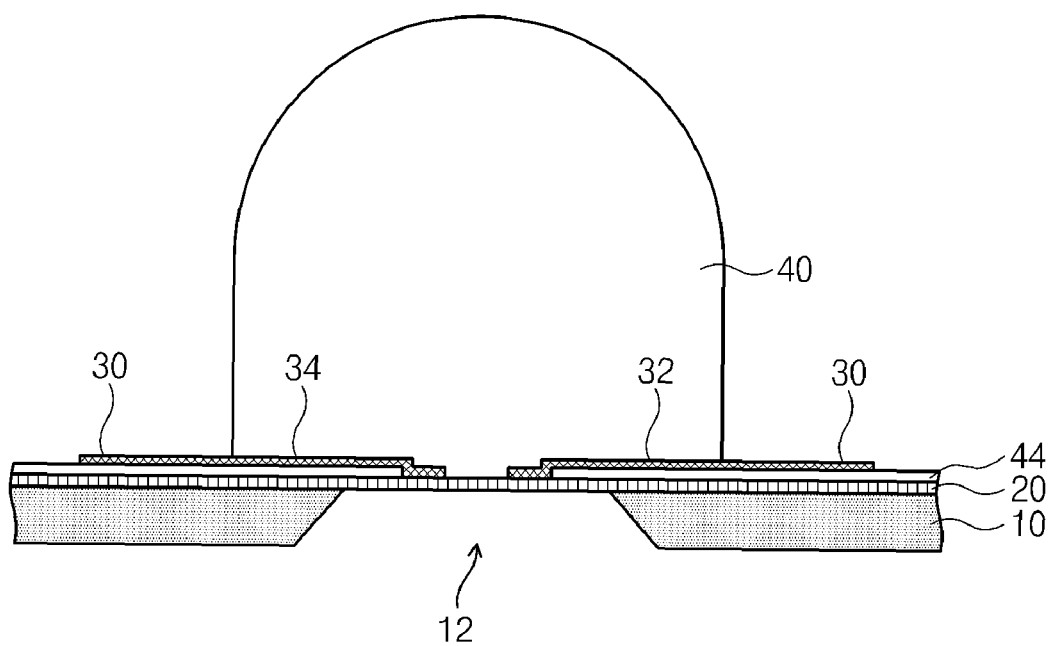

Referring to FIG. 5D, a portion of the undersurface of the substrate 10 where the lens 40 is formed is etched to form a first opening 12 that exposes the photo conductive layer 20. The first opening 12 may be formed using a photoresist layer (not shown) exposing the undersurface of the substrate as an etch mask. The substrate 10 may be wet-etched using a selective etchant (hydrochloric acid and phosphoric acid) to form the first opening 12. The selective etchant (hydrochloric acid and phosphoric acid) can selectively remove the substrate 10 formed on InP without damaging the photo conductive layer 20 formed of InGaAs.

Accordingly, the method of manufacturing an apparatus for generating/detecting terahertz wave according to the second embodiment can improve productivity because the method does not require delicate packaging technology by selectively removing the substrate 10 using the selective etchant (hydrochloric acid and phosphoric acid) without damaging the photo conductive layer 20 under the lens 40.

Eventually, the methods of manufacturing an apparatus for generating/detecting terahertz wave according to the embodiments can lower component price and reduce difficulties of manufacturing processes.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for generating/detecting terahertz wave, comprising:
    a substrate;
    a photo conductive layer on an entire surface of the substrate;
    a first electrode and a second electrode on the photo conductive layer, the first and second electrodes being spaced from each other by a certain gap;
    a lens on the first and second electrodes, the lens being filled in the gap between the first and second electrodes; and
    an etch block layer on the photo conductive layer,
    wherein the etch block layer comprises an opening that exposes the photo conductive layer in the gap between the first and second electrodes.

2. The apparatus of claim 1, wherein the lens is formed of a plastic material.

3. The apparatus of claim 2, wherein the lens has a dome or bell shape protruding from the first and second electrodes.

4. The apparatus of claim 3, wherein the lens is attached onto the first and second electrode by an adhesive.

5. The apparatus of claim 3, wherein the lens has a diameter greater than a total length of the first and second electrodes.

6. The apparatus of claim 1, wherein, if the substrate is formed of GaAs, the photo conductive layer is formed of a low-temperature GaAs.

7. The apparatus of claim 6, wherein, if the substrate is formed of InP, the photo conductive layer is formed of a low-temperature InGaAs or an ion implantation InGaAs.

8. The apparatus of claim 1, wherein the substrate comprises a first opening overlapping with the gap between the first and second electrodes.

9. The apparatus of claim 8, wherein the first opening has a smaller size than a diameter of the lens.

10. The apparatus of claim 1, wherein the opening of the etch block layer has a smaller size than a diameter of the lens.

11. The apparatus of claim 1, further comprising an etch stopper layer on an entire undersurface of the photo conductive layer over the substrate.

12. A method of manufacturing an apparatus for generating/detecting terahertz wave, the method comprising:
    forming a photo conductive layer on a substrate;
    forming a first electrode and a second electrode on the photo conductive layer, the first and second electrodes being spaced from each other by a certain gap;
    forming a lens filled in the gap between the first and second electrodes and protruding from the first and second electrodes;
    forming a first opening exposing the photo conductive layer by etching the substrate, the first opening overlapping with the gap; and
    forming an etch block layer or an insulating layer between the first and second electrodes and the photo conductive layer.

13. The method of claim 12, wherein the lens is attached onto the first and second electrodes and an inside of the gap between the first and second electrodes by an adhesive.

14. The method of claim 13, further comprising forming an etch stopper layer between the substrate and the photo conductive layer.

15. The method of claim 14, wherein, if the substrate is formed of GaAs, the forming of the first opening comprises removing the substrate using a citric acid etchant to expose the etch stopper layer.

16. The method of claim 12, wherein the etch block layer or the insulating layer comprises a second opening that exposes the photo conductive layer under the lens.

17. The method of claim 12, wherein, if the substrate is formed of InP and the photo conductive layer is formed of a low-temperature InGaAs, the forming of the first opening comprises removing the substrate using a etchant having a etch selectivity with respect to the substrate compared to the photo conductive layer.

18. An apparatus for generating/detecting terahertz wave, comprising:
    a substrate;
    a photo conductive layer on an entire surface of the substrate;
    a first electrode and a second electrode on the photo conductive layer, the first and second electrodes being spaced from each other by a certain gap;
    a lens on the first and second electrodes, the lens being filled in the gap between the first and second electrodes; and
    an etch block layer between the first and second electrodes and the photo conductive layer.

* * * * *